Aug. 14, 1945.  G. N. THOMAS  2,382,677
LEADER CONTROL FOR FISH LINES
Filed Dec. 2, 1943
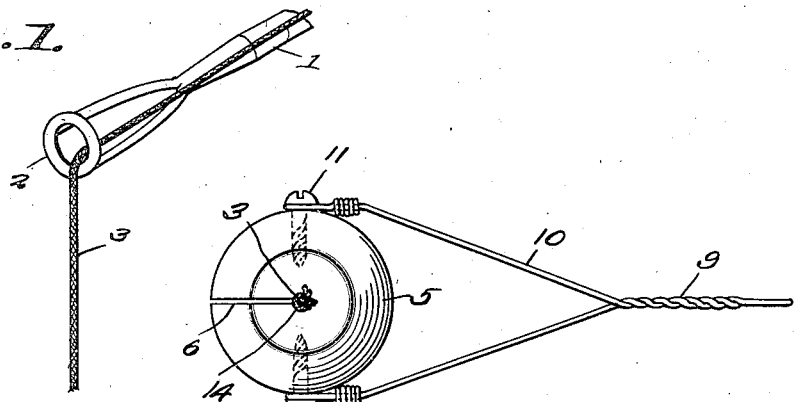
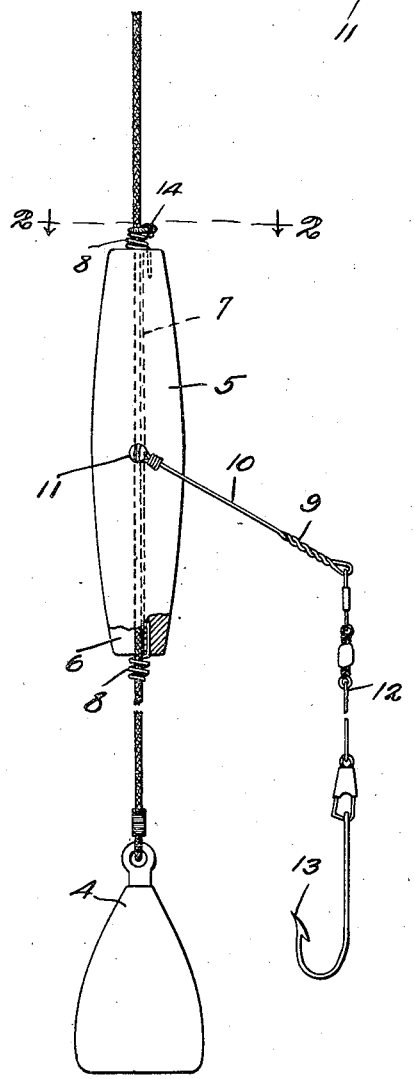
G. N. Thomas
INVENTOR.
BY
*A. Snowles*
ATTORNEYS.

Patented Aug. 14, 1945

2,382,677

UNITED STATES PATENT OFFICE 2,382,677

LEADER CONTROL FOR FISHLINES

George N. Thomas, Mankato, Minn.

Application December 2, 1943, Serial No. 512,621

1 Claim. (Cl. 43—27)

This invention relates to a leader control for lines used in fishing, one of the objects being to provide a simple but very efficient means whereby the bait can be supported at any predetermined distance from the bottom of the body of water, the means employed being such as not to interfere with casting.

A further object is to provide a device of this character the leader of which is so supported that when live bait is used, it can swim around in a circular path or up and down relative to the line and still be maintained below a predetermined point beneath the surface of the water.

A still further object is to provide means whereby the bait can be maintained at any depth in swift water, the means employed for this purpose being such as not to interfere with the usual reeling or unreeling of the line.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Fig. 1 is an elevation with parts of the line broken away and a portion of the float in section, and showing the means for holding the float down to a predetermined level.

Fig. 2 is an enlarged section on line 2—2, Fig. 1.

Fig. 3 is an enlarged elevation of that portion of the line provided with a float stop.

Referring to the figures by characters of reference, I designates a portion of a fishing pole having the usual end guide or ring 2 through which the line 3 is adapted to move freely. A weight or sinker 4 is secured to the end of the line as ordinarily. The foregoing parts are all well known in the art and do not in themselves constitute any part of the present invention.

Mounted to slide freely on the line is an elongated float 5 having a longitudinal slot 6 opening into a central longitudinal opening 7 in which the line is seated. Guide coils 8 or the like are secured to the ends of the float for extending around the line and holding the float against separation therefrom. The float is adapted to slide freely along the line.

An arm 9 has a fork 10 at one end which straddles the float 5 and is pivotally connected thereto as at 11, the points of connection being preferably midway between the ends of the float. Arm 9 carries the leader 12 to which the hook 13 is secured.

When it is desired to fish at a predetermined distance above the bottom of a body of water, said distance is measured off along the line from the bottom of the float 5 and a short cord 14 is then tied tightly about the line 3 and its ends are cut off close to the knot. This cord with its knot is to be of such size as to travel freely through the guide 2 while the line is being reeled or while a cast is being made. After the stop formed by the cord 14 has been secured in proper position and the line reeled in, the sinker 4 and the float 5 will of course be located at the end of the line. The line can then be cast in the usual manner and during this casting operation the line will pay out and the stop 14 will move with it through the guide 2. The sinker 4 will continue downwardly after striking the water, pulling the line with it and also pulling the knot 14 with it. When this knot reaches the upper guide coil or loop 8, it will pick up the float 5 and carry the float downwardly below the surface of the water until the sinker reaches bed bottom. Thus the bait on the hook 13 will be supported at the level below the surface of the water where the fishing is to take place and if this bait is live, it can swim around in a circle causing the float 5 to rotate therewith on the line or it can swim downwardly pulling the float with it and upwardly until the float 5 reaches the stop.

As the cord 14 will tighten when it is wet, it will operate as an efficient stop for the float. However by exerting sufficient pressure against this stop, it can be pushed from one position to another when adjustments are made for controlling the depth at which the fishing is to take place.

This invention has been found especially advantageous in deep-sea fishing as well as in fishing in swift water. Under the last mentioned conditions the bait will stay where it is put, namely, at a predetermined level beneath the surface of the water. As before stated the line can be reeled in and cast in the same manner as any other line because the stop is of such size as not to interfere with these operations.

What is claimed is:

The combination with a fishing line, a stop thereon, and a sinker at one end of the line, of a float having a radial slot extending thereinto throughout its length proportioned to receive and loosely embrace a portion of the line, means at the ends of the float for encircling the line and guiding the float therealong, a fork straddling and pivotally connected to the float, and means for connecting a bait hook to the fork, said hook and fork constituting means for transmitting rotary and longitudinal movement to the float relative to the line when engaged by live bait.

GEORGE N. THOMAS.